(12) United States Patent
Taherzadeh Boroujeni et al.

(10) Patent No.: US 11,723,043 B2
(45) Date of Patent: Aug. 8, 2023

(54) HIERARCHY OF SCHEDULING REQUESTS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/325,846

(22) Filed: May 20, 2021

(65) Prior Publication Data

US 2021/0368531 A1 Nov. 25, 2021

Related U.S. Application Data

(60) Provisional application No. 63/028,812, filed on May 22, 2020.

(51) Int. Cl.
*H04W 72/23* (2023.01)
(52) U.S. Cl.
CPC .................................. *H04W 72/23* (2023.01)
(58) Field of Classification Search
CPC ..................................................... H04W 72/23
USPC ......................................................... 370/329
See application file for complete search history.

(56) References Cited

U.S. PATENT DOCUMENTS

2017/0142749 A1* 5/2017 Kim ...................... H04W 72/23
2022/0368403 A1* 11/2022 Tang ...................... H04B 7/088

OTHER PUBLICATIONS

International Search Report and Written Opinion—PCT/US2021/033546—ISA/EPO—dated Oct. 11, 2021.
ZTE: "Consideration on Physical Uplink Control Channel for MTC Enhancement," 3GPP TSG RAN WG1 Meeting #80bis, 3GPP Draft, R1-151731, 3rd Generation Partnership Project (3GPP), Mobile Competence Centre, 650, Route Des Lucioles, F-06921 Sophia-Antipolis Cedex, France, vol. RAN WG1, No. Belgrade, Serbia, Apr. 20, 2015-Apr. 24, 2015, 6 Pages, Apr. 19, 2015 (Apr. 19, 2015), XP050934592, Retrieved from the Internet: URL: http://www.3gpp.org/ftp/Meetings_3GPP_SYNC/RAN1/Docs/[retrieved on Apr. 19, 2015] section 2.2.

* cited by examiner

*Primary Examiner* — Peter G Solinsky
(74) *Attorney, Agent, or Firm* — Patterson + Sheridan, L.L.P.

(57) ABSTRACT

Certain aspects of the subject matter described in this disclosure can be implemented in a method for wireless communication by a user equipment (UE). The method generally includes transmitting a scheduling request (SR) to a base station (BS) to request resource allocation for data transmission, wherein the SR is selected between at least one coverage-enhancement SR configuration and another SR configuration at the UE for requesting the resource allocation for the data transmission and receiving an indication indicating the resource allocation for the data transmission.

29 Claims, 11 Drawing Sheets

500

505

TRANSMIT, BY A USER EQUIPMENT (UE), A SCHEDULING REQUEST (SR) TO A BASE STATION (BS) TO REQUEST RESOURCE ALLOCATION FOR DATA TRANSMISSION, WHEREIN THE SR IS SELECTED BETWEEN AT LEAST ONE COVERAGE-ENHANCEMENT SR CONFIGURATION AND ANOTHER SR CONFIGURATION AT THE UE FOR REQUESTING THE RESOURCE ALLOCATION FOR THE DATA TRANSMISSION

510

RECEIVE, BY THE, UE, AN INDICATION OF THE RESOURCE ALLOCATION FOR THE DATA TRANSMISSION

605
RECEIVE, BY A BASE STATION (BS), FROM A USER EQUIPMENT (UE), A SCHEDULING REQUEST (SR) FOR REQUESTING RESOURCE ALLOCATION FOR DATA TRANSMISSION

610
DETERMINE, BY THE BS, WHETHER THE SR IS IN ACCORDANCE WITH A COVERAGE-ENHANCEMENT SCHEDULING REQUEST (SR) CONFIGURATION OR ANOTHER SR CONFIGURATION

615
GENERATE, BY THE BS, DOWNLLINK CONTROL INFORMATION (DCI) INDICATING THE RESOURCE ALLOCATIONF OR THE DATA TRANSMISSION

620
TRANSMIT, BY THE BS, THE DCI TO THE UE

705
SELECT, BY A USER EQUIPMENT (UE), BETWEEN A COVERAGE-ENHANCEMENT SCHEDULING REQUEST (SR) CONFIGURATION AND ANOTHER SR CONFIGURATION AT THE UE FOR REQUESTING RESOURCE ALLOCATION FOR DATA TRANSMISSION

710
GENERATE, BY THE UE, AN SR IN ACCORDANCE WITH THE SELECTION

715
TRANSMIT, BY THE UE, THE SR TO A BASE STATION (BS) TO REQUEST THE RESOURCE ALLOCATION FOR THE DATA TRANSMISSION

720
RECEIVE, BY THE UE, DOWNLINK CONTROL INFORMATION (DCI) INDICATING THE RESOURCES ALLOCATION FOR THE DATA TRANSMISSION

FIG. 7

HIERARCHY OF SCHEDULING REQUESTS

CROSS-REFERENCE TO RELATED APPLICATION(S)

This application claims benefit of and priority to U.S. Provisional Application No. 63/028,812 filed May 22, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for requesting scheduling.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for requesting scheduling.

Certain aspects of the subject matter described in this disclosure can be implemented in a method for wireless communication by a user equipment (UE). The method generally includes transmitting a scheduling request (SR) to a base station (BS) to request resource allocation for the data transmission, wherein the SR is selected between at least one coverage-enhancement SR configuration and another SR configuration at the UE for requesting resource; and receiving an indication of the resource allocation for the data transmission.

Certain aspects of the subject matter described in this disclosure can be implemented in a method for wireless communication by a BS. The method generally includes receiving, from a UE, an SR requesting resource allocation for data transmission and transmitting an indication to the UE indicating the resource allocation for the data transmission, wherein the indication is generated based on whether the SR is in accordance with at least one coverage-enhancement SR configuration or another SR configuration.

Certain aspects of the subject matter described in this disclosure can be implemented in an apparatus for wireless communication by a UE. The apparatus generally includes a memory; and one or more processors coupled to the memory, the memory and the one or more processors being configured to: transmit an SR to a BS to request resource allocation for data transmission, wherein the SR is selected between at least one coverage-enhancement SR configuration and another SR configuration at the UE for requesting the resource allocation for the data transmission; and receive an indication of the resource allocation for the data transmission.

Certain aspects of the subject matter described in this disclosure can be implemented in an apparatus for wireless communication by a BS. The apparatus generally includes a memory; and one or more processors coupled to the memory, the memory and the one or more processors being configured to: receive, from a UE, an SR requesting resource allocation for data transmission and transmit an indication to the UE indicating the resource allocation for the data transmission, wherein the indication is generated based on whether the SR is in accordance with at least one coverage-enhancement SR configuration or another SR configuration.

Certain aspects of the subject matter described in this disclosure can be implemented in an apparatus for wireless communication by a UE. The apparatus generally includes means for transmitting an SR to a BS to request resource allocation for data transmission, wherein the SR is selected between at least one coverage-enhancement SR configuration and another SR configuration at the UE for requesting the resource allocation for the data transmission; and means for receiving an indication of the resource allocation for the data transmission.

Certain aspects of the subject matter described in this disclosure can be implemented in an apparatus for wireless communication by a BS. The apparatus generally includes means for receiving, from a UE, an SR requesting resource allocation for data transmission and means for transmitting an indication to the UE indicating the resource allocation for the data transmission, wherein the indication is generated based on whether the SR is in accordance with at least one coverage-enhancement SR configuration or another SR configuration.

Certain aspects of the subject matter described in this disclosure can be implemented in a computer-readable medium having instructions stored thereon to cause a UE to: transmit an SR to a BS to request resource allocation for data transmission, wherein the SR is selected between at least one coverage-enhancement SR configuration and another SR configuration at the UE for requesting the resource allocation for the data transmission; and receive an indication of the resource allocation for the data transmission.

Certain aspects of the subject matter described in this disclosure can be implemented in a computer-readable medium having instructions stored thereon to cause a BS to: receive, from a UE, an SR requesting resource allocation for data transmission and transmit an indication to the UE indicating the resource allocation for the data transmission, wherein the indication is generated based on whether the SR is in accordance with at least one coverage-enhancement SR configuration or another SR configuration.

Certain aspects of the subject matter described in this disclosure can be implemented in a method for wireless communication by a UE. The method generally includes selecting between a coverage-enhancement SR configuration and another SR configuration at the UE for requesting resource allocation for data transmission, generating a SR in accordance with the selection, transmitting the SR to a BS to request the resource allocation for the data transmission; and receiving DCI indicating the resources allocation for the data transmission.

Certain aspects of the subject matter described in this disclosure can be implemented in a method for wireless communication by a BS. The method generally includes receiving, from a UE, a SR for requesting resource allocation for data transmission, determining whether the SR is in accordance with a coverage-enhancement SR configuration or another SR configuration, generating DCI indicating the resource allocation for the data transmission, and transmitting the DCI to the UE.

Certain aspects of the subject matter described in this disclosure can be implemented in an apparatus for wireless communication by a UE. The apparatus generally includes a memory; and one or more processors coupled to the memory, the memory and the one or more processors being configured to: select between a coverage-enhancement SR configuration and another SR configuration at the UE for requesting resource allocation for data transmission; generate a SR in accordance with the selection; transmit the SR to a BS to request the resource allocation for the data transmission; and receive DCI indicating the resources allocation for the data transmission.

Certain aspects of the subject matter described in this disclosure can be implemented in an apparatus for wireless communication by a BS. The apparatus generally includes a memory; and one or more processors coupled to the memory, the memory and the one or more processors being configured to: receive, from a UE, a SR for requesting resource allocation for data transmission; determine whether the SR is in accordance with a coverage-enhancement SR configuration or another SR configuration; generate DCI indicating the resource allocation for the data transmission; and transmit the DCI to the UE.

Certain aspects of the subject matter described in this disclosure can be implemented in an apparatus for wireless communication by a UE. The apparatus generally includes means for selecting between a coverage-enhancement SR configuration and another SR configuration at the UE for requesting resource allocation for data transmission; means for generating a SR in accordance with the selection; means for transmitting the SR to a BS to request the resource allocation for the data transmission; and means for receiving DCI indicating the resources allocation for the data transmission.

Certain aspects of the subject matter described in this disclosure can be implemented in an apparatus for wireless communication by a BS. The apparatus generally includes means for receiving, from a UE, a SR for requesting resource allocation for data transmission; means for determining whether the SR is in accordance with a coverage-enhancement SR configuration or another SR configuration; means for generating DCI indicating the resource allocation for the data transmission; and means for transmitting the DCI to the UE.

Certain aspects of the subject matter described in this disclosure can be implemented in a computer-readable medium having instructions stored thereon to cause a UE to: select between a coverage-enhancement SR configuration and another SR configuration at the UE for requesting resource allocation for data transmission; generate a SR in accordance with the selection; transmit the SR to a BS to request the resource allocation for the data transmission; and receive DCI indicating the resources allocation for the data transmission.

Certain aspects of the subject matter described in this disclosure can be implemented in a computer-readable medium having instructions stored thereon to cause a base station to: receive, from a UE, a SR for requesting resource allocation for data transmission; determine whether the SR is in accordance with a coverage-enhancement SR configuration or another SR configuration; generate DCI indicating the resource allocation for the data transmission; and transmit the DCI to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a flow diagram illustrating example operations for wireless communication by a UE, in accordance with certain aspects of the present disclosure.

FIG. 6 is a flow diagram illustrating example operations by a BS for responding to scheduling requests, in accordance with certain aspects of the present disclosure.

FIG. 7 is a flow diagram illustrating example operations for requesting scheduling by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
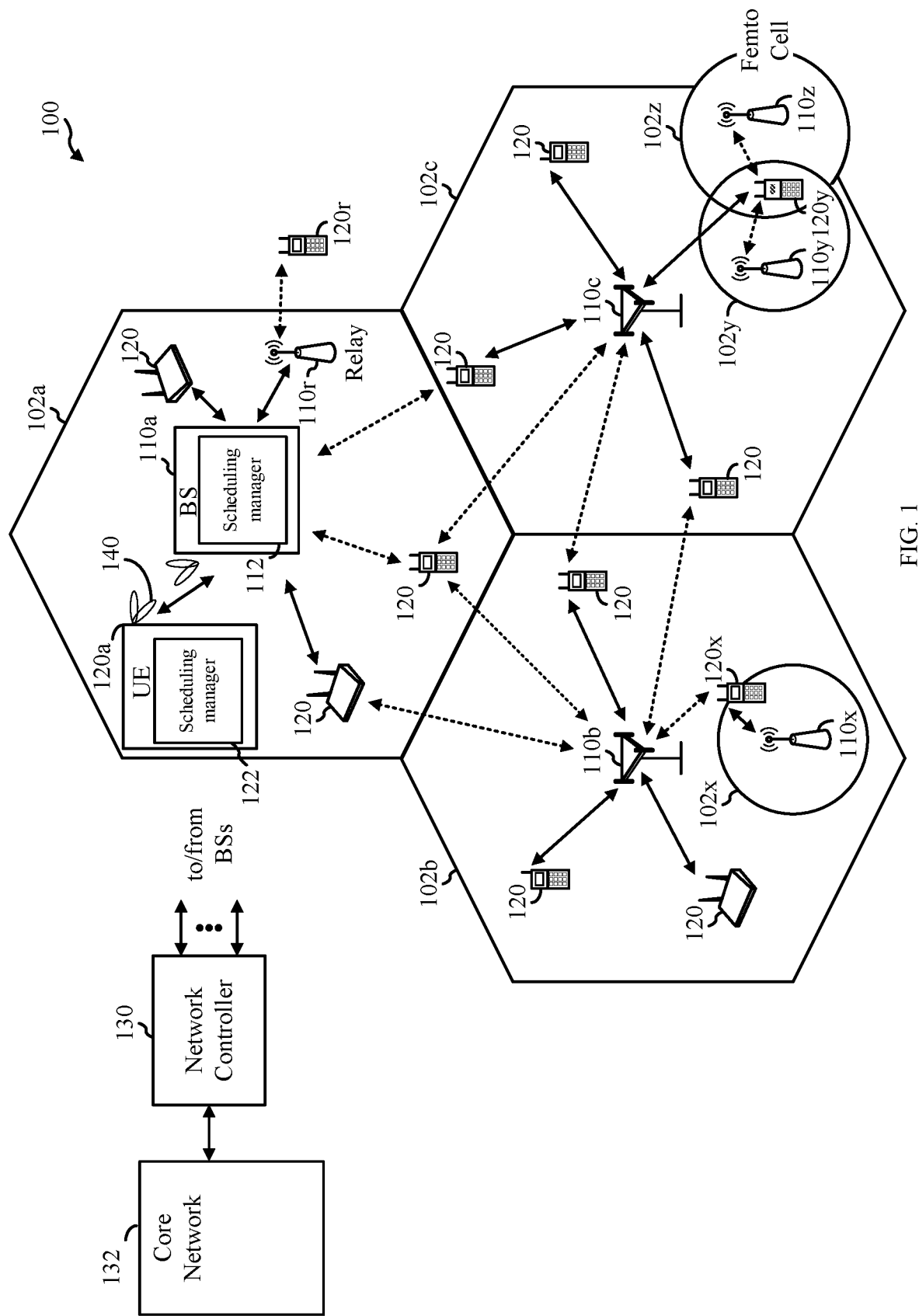
FIG. 1 is a block diagram conceptually illustrating an example telecommunications system, in accordance with certain aspects of the present disclosure.

Aspects of the present disclosure provide apparatus, methods, processing systems, and computer readable mediums for requesting scheduling of resources for data transmission. For example, a coverage-enhancement scheduling request (SR) may be configured at a user equipment (UE) to enhance coverage of a transmission. As used herein, enhancement of coverage for a transmission may refer to any improvement in a transmission, such as improving reliability or throughput associated with the transmission.

A coverage enhancement SR generally refers to an SR transmission that increases coverage for data scheduling, by for example, increasing coverage of the SR transmission as compared to a regular SR, indicating to a base station (BS) to implement coverage enhancement procedures for the scheduling of a data transmission or the data transmission itself, or both. As an example, the coverage of the SR transmission may be enhanced by multiple repetitions of the regular SR. In another example, the coverage of a data transmission may be enhanced by triggering channel state information (CSI)-reference signal (RS) transmissions by the BS or by triggering the BS to apply repetition to one or more data transmissions.

In some cases, a beam used for transmission may become weak or may suffer from partial shadowing. Certain aspects provide techniques for establishing a certain level of performance for the channel, in spite of the weaker beam still being active. Moreover, certain aspects provide techniques for a UE to trigger CSI operations such that reliable CSI feedback may be used by a BS for new beam assignments. Thus, to establish this level of performance and reliability for transmissions when using the weaker beam, a UE may be configured with the coverage enhancement SR. In other words, in one or more aspects, a UE may detect coverage issues earlier than the BS, and may take one or more actions to enhance coverage for an active beam. The UE may select to transmit a request for scheduling using the coverage-enhancement SR when the quality of the channel for the request or data transmission has degraded or when there is a lack of a response to the SR from a base station (BS) to improve transmission coverage.

The following description provides examples of techniques for requesting scheduling in communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more BSs 110 and/or UEs 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

As shown in FIG. 1, one or more transmit (TX) and receive (RX) beams 140 may be used for communication (e.g., DL and uplink (UL) communication) between BS 110a and UE 120a. In some cases, a beam 140 used for communication between BS 110a and UE 120a may fail, and a beam failure condition may be detected. Accordingly, a new candidate beam for resolving the beam failure condition may be identified and a beam failure recovery process may be initiated with the candidate beam.

According to certain aspects, the BSs 110 and UEs 120 may be configured for managing requests for scheduling. As shown in FIG. 1, the BS 110a includes a scheduling manager 112. The scheduling manager 112 may be configured for receiving, from a UE, an SR for requesting resource allocation for data transmission, and transmitting an indication to the UE indicating the resource allocation for the data transmission, where the indication is generated based on whether the SR is in accordance with at least one coverage-enhancement SR configuration or another SR configuration, in accordance with aspects of the present disclosure. As shown in FIG. 1, the UE 120a includes a scheduling manager 122. The scheduling manager 122 may be configured for transmitting an SR to a BS to request resource allocation for data transmission, where the SR is selected between at least one coverage-enhancement SR configuration and another SR configuration at the UE for requesting the resource allocation for the data transmission, and receiving an indication of the resource allocation for the data transmission, in accordance with aspects of the present disclosure.

Figure 2:
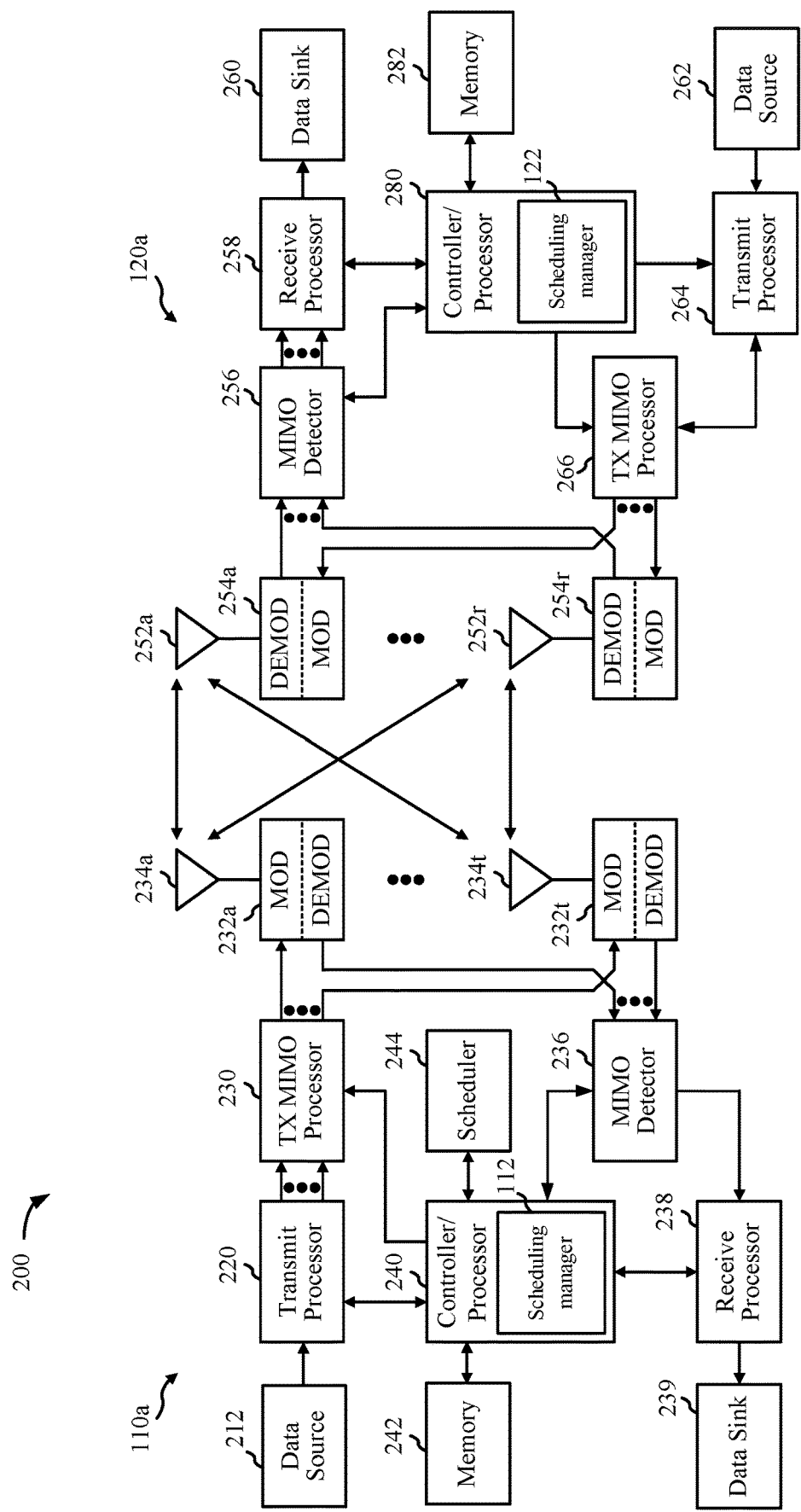
FIG. 2 is a block diagram conceptually illustrating a design of an example a base station (BS) and user equipment (UE), in accordance with certain aspects of the present disclosure.

FIG. 2 illustrates example components 200 of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a DL signal. DL signals from modulators 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the UL, at UE 120a, a transmit processor 264 may receive and process data (e.g., for the PUSCH) from a data source 262 and control information (e.g., for the physical uplink control channel (PUCCH) from the controller/processor 280. The transmit processor 264 may also generate reference symbols for a reference signal (RS) (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the UL signals from the UE 120a may be received by the antennas 234, processed by the modulators 232, detected by a MIMO detector 236, if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a scheduling manager 112, according to aspects described herein. As shown in FIG. 2, the controller/processor 280 of the UE 120a has a scheduling manager 122, according to aspects described herein. Although shown at the controller/processor, other components of the UE 120a and BS 110a may be used to perform the operations described herein.

NR may utilize OFDM with a cyclic prefix (CP) on the UL and DL. NR may support half-duplex operation using time division duplexing (TDD). OFDM and single-carrier frequency division multiplexing (SC-FDM) may partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Figure 3:
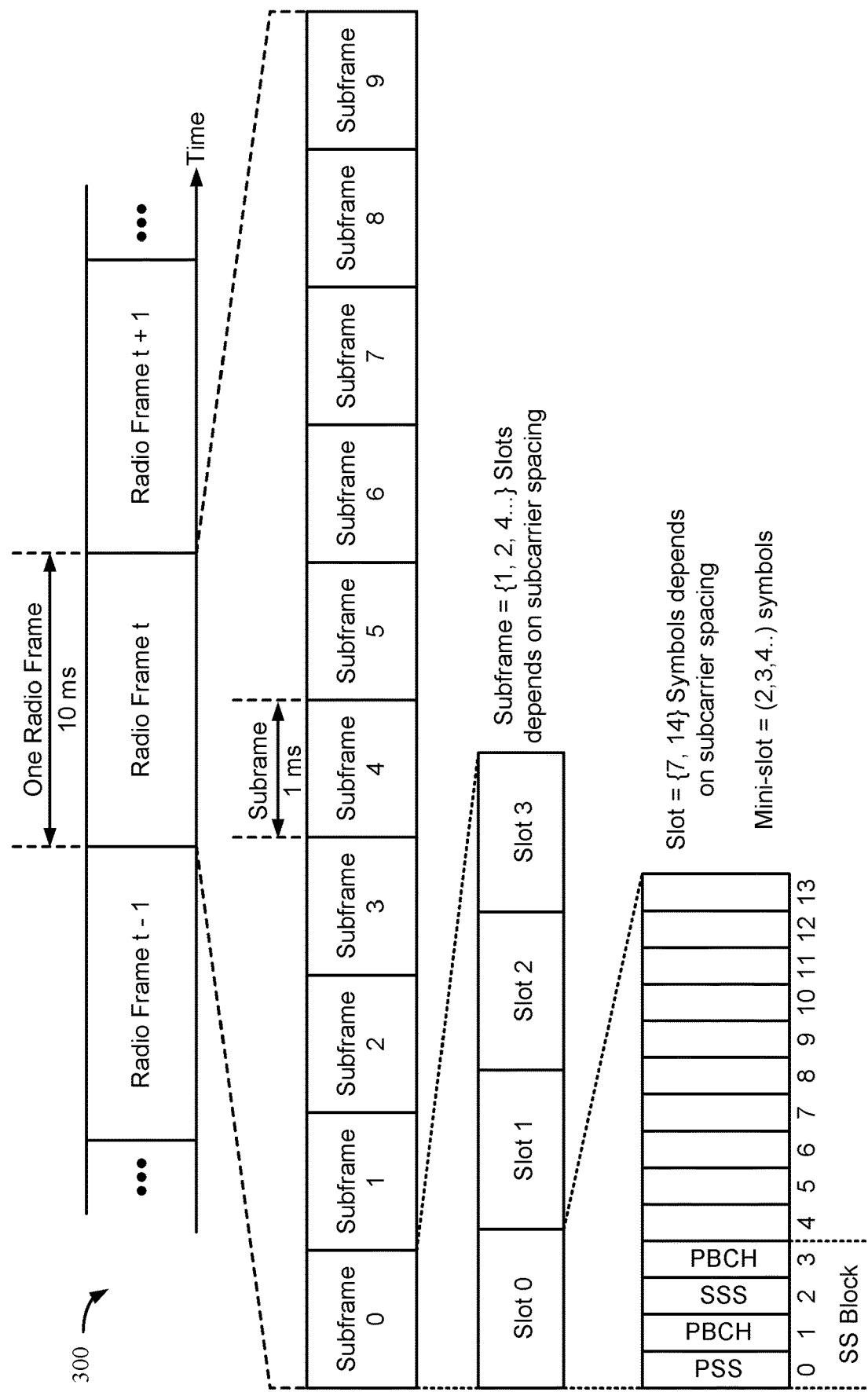
FIG. 3 is an example frame format for new radio (NR), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a TTI having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Techniques for Requesting Scheduling

Beam reliability may affect coverage for unicast channels (e.g., in frequency range 2 (FR2)). In some cases, a narrow unicast beam may become weak or may suffer from partial shadowing. Certain aspects provide techniques for establishing a certain level of performance for the unicast channel, in spite of the weaker beam still being active. Moreover, certain aspects provide techniques for a UE to trigger channel state information (CSI) operations such that reliable CSI feedback may be used by a base station (BS) to decide about new beam assignments. In some cases, a UE may detect coverage issues sooner than the BS, and may take one or more actions to enhance coverage for an active beam. Certain aspects of the present disclosure are directed to techniques for coverage enhancement to be indicated for a scheduling request (SR) or by an SR, as described in more detail herein.

Figure 4:
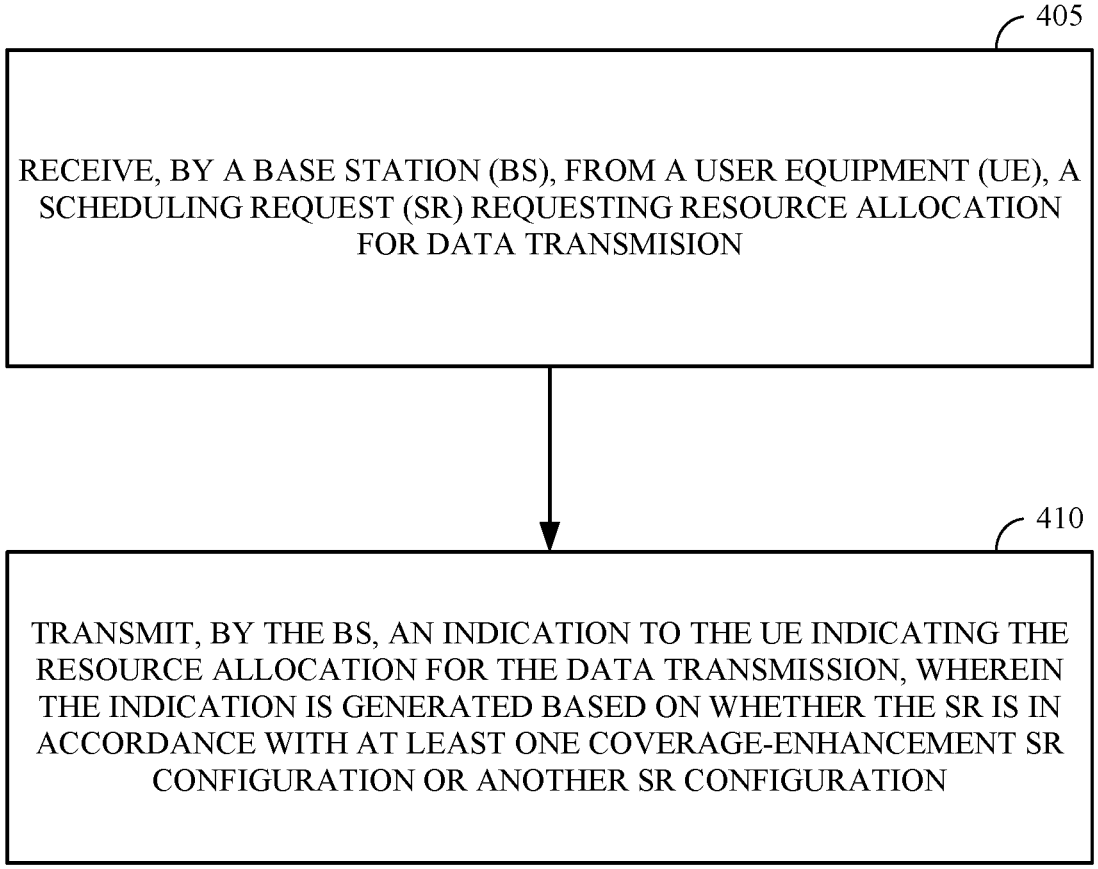
FIG. 4 is a flow diagram illustrating example operations for wireless communication by a BS, in accordance with certain aspects of the present disclosure.

FIG. 4 is a flow diagram illustrating example operations 400 for wireless communication, in accordance with certain aspects of the present disclosure. The operations 400 may be performed, for example, by a BS (e.g., such as the BS 110a in the wireless communication network 100).

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 405, with the BS receiving, from a UE, an SR requesting resource allocation for data transmission At block 410, the BS may transmit an indication to the UE indicating the resource allocation for the data transmission, wherein the indication is generated based on whether the SR is in accordance with at least one coverage-enhancement SR configuration or another SR configuration. In certain aspects, the indication may include downlink control information (DCI).

FIG. 5 is a flow diagram illustrating example operations 500 for wireless communication, in accordance with certain aspects of the present disclosure. The operations 500 may be performed, for example, by a UE (e.g., such as UE 120a in the wireless communication network 100).

The operations 500 may be complementary operations by the UE to the operations 400 performed by the BS. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE transmitting an SR to a BS to request resource allocation for data transmission, wherein the SR is elected between at least one coverage-enhancement SR configuration (also referred to as a coverage-enhanced SR configuration) and another SR configuration (e.g., also referred to as a regular SR configuration or a regular SR) at the UE for requesting the resource allocations for the data transmission.

According to certain aspects, the coverage-enhancement SR configuration may include multiple coverage-enhancement SR configurations. A type of each of the multiple coverage-enhancement SR configurations may be associated with a cause for selecting the at least one coverage-enhancement SR configurations over the other SR configuration. In some cases, the coverage-enhancement SR configuration may be a configuration for SR transmission with enhanced coverage. For example, the coverage-enhancement SR configuration may include repetitions of the regular SR. In some cases, the coverage-enhanced SR may indicate to the BS to take one or more actions to enhance coverage for the data transmission (e.g., physical uplink shared channel (PUSCH)) (or the scheduling of the data transmission). For example, the coverage-enhanced SR may indicate, to the BS, to apply repetition to physical downlink control channel (PDCCH) transmissions. In another example, the coverage-enhanced SR may indicate, to the BS, to trigger CSI-RS transmissions to enhance coverage for the data transmission.

One type of coverage-enhancement SR configuration may be used when degraded channel quality is experienced. Another type of coverage-enhancement SR configuration may be used if there is a lack of response from the BS.

In certain aspects, the coverage-enhancement SR configuration may be configured at the UE for requesting the resource allocation on a channel that experiences degraded channel quality. In certain aspects, the coverage-enhancement SR configuration may be configured at the UE for requesting the resource allocation when there is a lack of a response to the SR from the BS.

At block 510, the UE receives an indication of the resource allocation for the data transmission. In certain aspects, the indication may include downlink control information (DCI).

FIG. 6 is a flow diagram illustrating example operations 600 by a BS for responding to scheduling requests, in accordance with certain aspects of the present disclosure. The operations 600 may be performed, for example, by BS 110a in the wireless communication network 100.

Operations 600 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, with the BS receiving, from a UE, a SR for requesting resource allocation for data transmission. At block 610, the BS may determine whether the SR is in accordance with a coverage-enhancement SR configuration (also referred to as coverage-enhanced SR configuration) or another SR configuration (e.g., a regular SR configuration). At block 615, the BS may generate DCI indicating the resource allocation for the data transmission, and at block 620, transmit the DCI to the UE.

FIG. 7 is a flow diagram illustrating example operations 700 for requesting scheduling by a UE, in accordance with certain aspects of the present disclosure. The operations 700 may be performed, for example, by UE 120a in the wireless communication network 100.

The operations 700 may be complementary operations by the UE to the operations 600 performed by the BS. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 705, with the UE selecting between a coverage-enhancement SR configuration (also referred to as a coverage-enhanced SR configuration) and another SR configuration (e.g., also referred to as a "regular SR") at the UE for requesting resource allocation for data transmission. For example, the coverage-enhancement SR configuration may be configured at the UE for requesting the resource allocation on a channel experiences degraded channel quality.

In some cases, the coverage-enhancement SR configuration may be a configuration for SR transmission with enhanced coverage. For example, the coverage-enhancement SR configuration may include repetitions of the regular SR. In some cases, the coverage-enhanced SR may indicate to the BS to take one or more actions to enhance coverage for the data transmission (or the scheduling of the data transmission). For instance, the coverage-enhanced SR may indicate, to the base station, to trigger CSI-RS transmissions to enhance coverage for the data transmission.

At block 710, the UE generates a SR in accordance with the selection, and at block 715, transmits the SR to a BS to request the resource allocation for the data transmission. At block 720, the UE receives DCI indicating the resources allocation for the data transmission.

In some cases, the coverage-enhancement SR configuration may be associated with a different policy for triggering beam failure recovery (BFR) as compared to the regular SR configuration, as described in more detail herein. For example, the policy for triggering the BFR for the coverage-enhancement SR configuration may include a policy to trigger the BFR after a single failed attempt for requesting scheduling using the coverage-enhanced SR configuration.

In certain aspects, a BS may configure a UE with multiple configurations of SR, one of which may be the coverage-enhanced SR configuration described herein. For example, the BS may indicate different formats or types of SR with different resources, transmission parameters, duty cycles, or any combination thereof. The BS may transmit to the UE an indication of the coverage-enhanced SR configuration, while in other aspects, the configurations of SR may be preconfigured at the UE (e.g., in accordance with a standard). The coverage-enhanced SR configuration may have a different format than the regular SR configuration, may be associated with different time or frequency resources for transmission of a corresponding SR as compared to the regular SR configuration, may be associated with a different duty cycle for transmission of the corresponding SR as compared to the regular SR configuration, may be associated with different transmission parameters (e.g., transmit power) for transmission of the corresponding SR as compared to the regular SR configuration, or any combination thereof. For example, in some cases, occasions for coverage-enhanced SR transmission may be less frequent than occasions for regular SR.

In some aspects, a UE may be configured with regular SR and coverage-enhanced SR options. Using coverage-enhanced SR by the UE may implicitly be interpreted as a request for coverage enhancement for other channels or procedures. For instance, the coverage-enhanced SR may trigger a preconfigured CSI-RS procedure, or may indicate to the BS to allocate resources that provide enhanced coverage, as described herein. In another instance, the coverage-enhanced SR may trigger repetition of PDCCH transmissions by the BS. Accordingly, the UE may monitor for repetitions of PDCCH from the BS.

In some cases, the coverage-enhanced SR may be preconfigured at the UE (e.g., in accordance with a standard), as described herein. In other cases, the coverage-enhanced SR may be configured by the BS. In certain aspects, the coverage-enhanced SR (e.g., as either preconfigured at the UE or configured by the BS) may be activated by the BS (e.g., using DCI).

Figure 8:
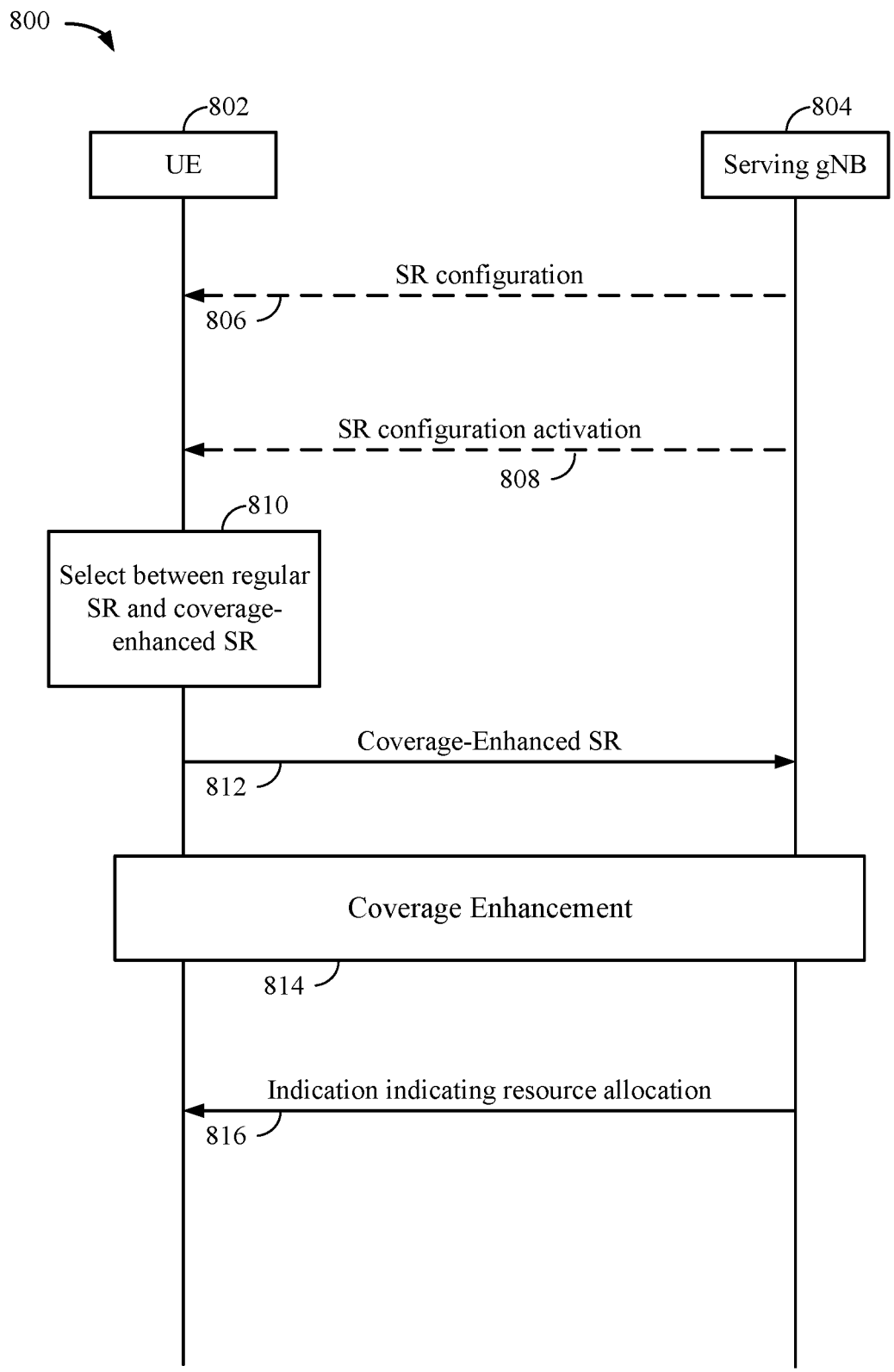
FIG. 8 is a call flow diagram illustrating example operations for configuring and activating a coverage-enhanced scheduling request (SR), in accordance with certain aspects of the present disclosure.

FIG. 8 is a call flow diagram illustrating example operations 800 for configuring and activating a coverage-enhanced SR, in accordance with certain aspects of the present disclosure. As illustrated, a UE 802 (e.g., such as UE 120*a* in the wireless communication network 100) may optionally receive, from a BS 804 (e.g., such as BS 110*a* in the wireless communication network 100), a message 806 (e.g., radio resource control (RRC) message) indicating a configuration for coverage-enhanced SR. The UE 802 may then receive a message 808 activating the coverage-enhanced SR, thereby allowing the UE 802 to use the coverage-enhanced SR in case of degraded channel quality or when there is a lack of response from BS 804 subsequent to transmitting more than one regular SR. In some cases, the message 808 may deactivate the regular SR configuration at the UE 802. For example, the network may determine that the UE 802 should use the coverage-enhanced SR, and may deactivate the regular SR at the UE 802 accordingly. At block 810, the UE 802 may select between the regular SR and the coverage-enhanced SR, and transmit the coverage-enhanced SR 812 accordingly. The BS 804 and the UE 802 may then perform coverage enhancements 814, as described herein. BS 804 may transmit an indication 816 (e.g., DCI, medium access control (MAC) control element (CE), or another dynamic indication) to the UE indicating the resource allocation for the data transmission. In some cases, the indication may indicate scheduling of CSI-RS transmissions. In some cases, the indication may indicate some change in transmission of the indication by the BS 804 (e.g., repetition of PDCCH transmissions) and monitoring of the indication by the UE 802.

In some cases, there may be different rules (e.g., policies) for triggering beam failure recovery (BFR) based on unsuccessful trials of each type of SR. For example, a single unsuccessful trial of coverage-enhanced SR may trigger BFR, whereas multiple unsuccessful trials of regular SRs may trigger BFR. Rules for triggering BFR (based on the history of different types of SR trials) may be configured by the UE. In some cases, coverage-enhanced SR may act as an intermediate stage between regular SR and triggering BFR, as described in more detail herein. For instance, after a certain number of unsuccessful trials of regular SR, the UE may try coverage-enhanced SR, before triggering BFR.

Figure 9:
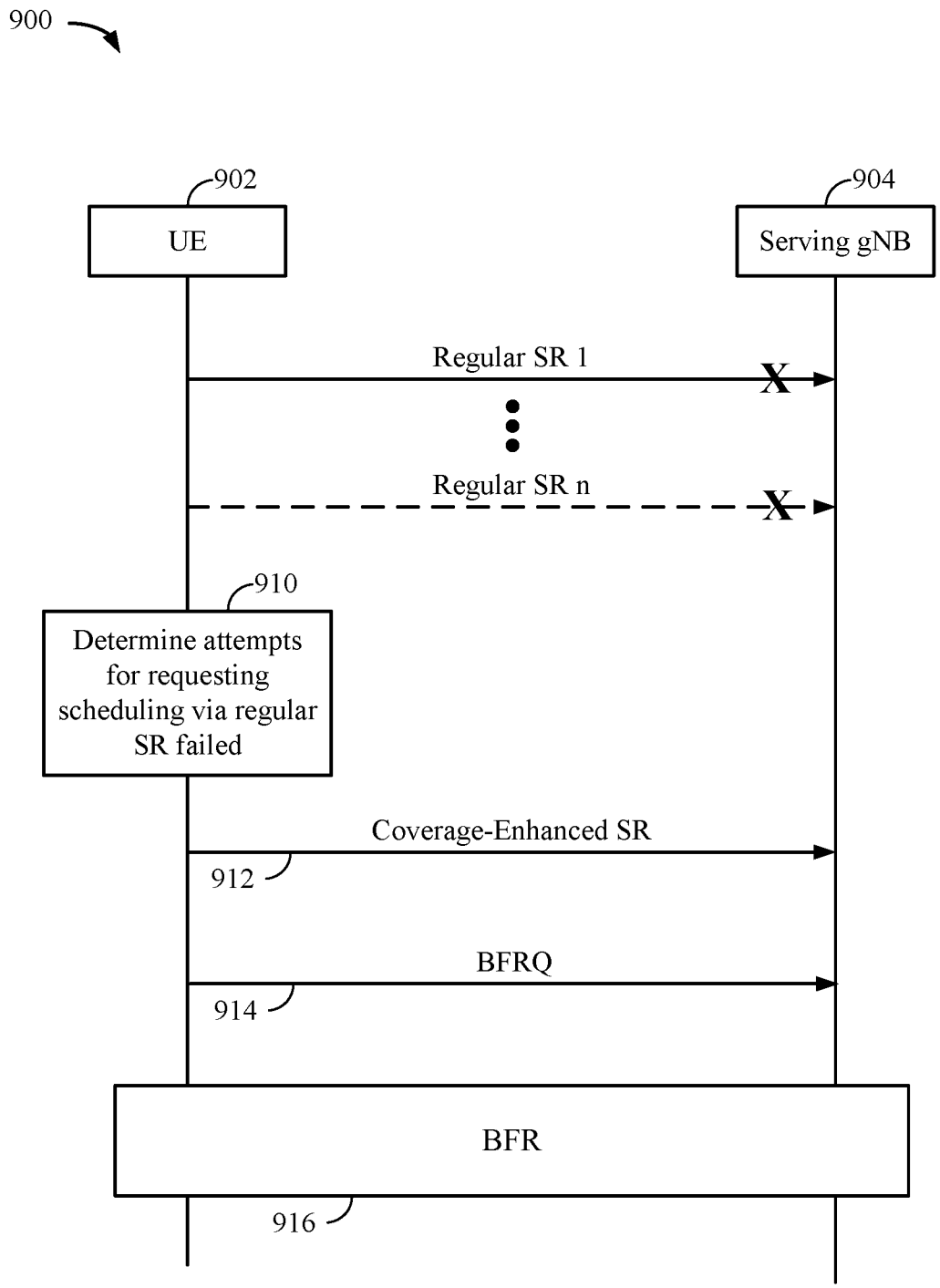
FIG. 9 is a call flow diagram illustrating example operations for triggering beam failure recovery (BFR), in accordance with certain aspects of the present disclosure.

FIG. 9 is a call flow diagram illustrating example operations 900 for triggering BFR, in accordance with certain aspects of the present disclosure. As illustrated, a UE 902 (e.g., such as UE 120*a* in the wireless communication network 100) may transmit a single regular SR or multiple regular SRs to BS 904 (e.g., such as BS 110*a* in the wireless communication network 100). For example, the UE 902 may transmit regular SR 1 to regular SR n, n being an integer equal to or greater than 1. At block 910, UE 902 may determine the attempts to request scheduling by regular SR have failed, and thus, the UE 902 may transition to using a coverage-enhanced SR 912 for requesting resource allocation. For example, once a threshold number of scheduling attempts have failed using regular SR, the UE 902 may transmit a coverage-enhanced SR. If the attempt for requesting scheduling using the coverage-enhanced SR also fails, the UE 902 may initiate BFR. For example, the UE 902 may transmit a BFR request (BFRQ) 914, initiating BFR procedures 916, as illustrated.

Figure 10:
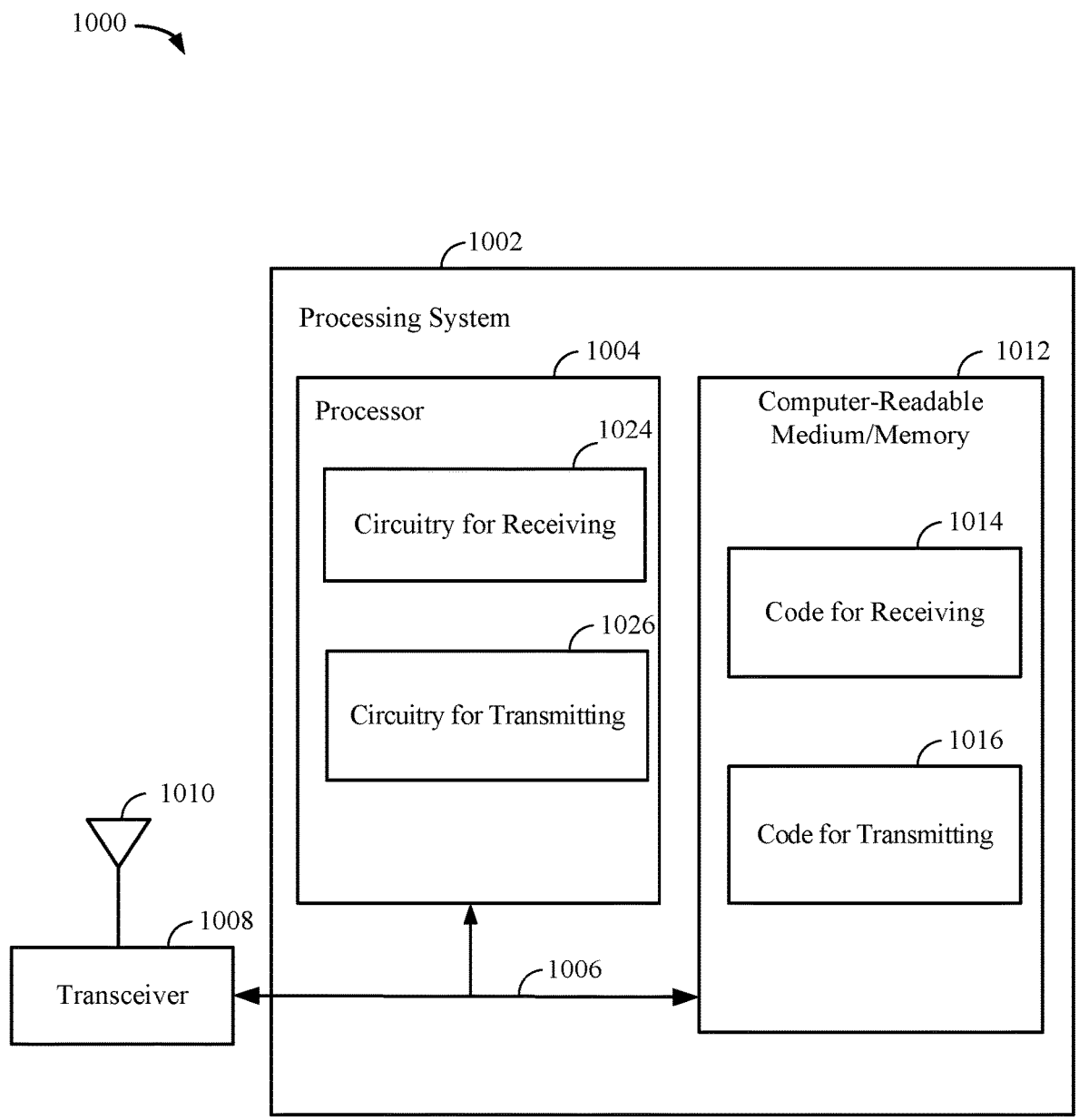
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations 400 illustrated in FIG. 4. The communications device 1000 includes a processing system 1002 coupled to a transceiver 108 (e.g., a transmitter and/or a receiver). The transceiver 108 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations 400 illustrated in FIG. 4, or other operations for performing the various techniques discussed herein for beam switching. In certain aspects, the processor 1004 can include one or more components of BS 110*a* with reference to FIG. 2 such as, for example, controller/processor 240, transmit processor 220, receive processor 238, and/or the like. Additionally, in certain aspects, computer-readable medium 1012 can include one or more components of BS 110*a* with reference to FIG. 2 such as, for example, memory 242 and/or the like.

In certain aspects, computer-readable medium/memory 1012 stores code 1014 (e.g., an example of means for) for receiving (e.g., for receiving, from a UE, an SR requesting resource allocation for data transmission) and code 1016 (e.g., an example of means for) for transmitting (e.g., for transmitting an indication to the UE indicating the resource allocation for the data transmission, wherein the indication is generated based on whether the SR is in accordance with a coverage-enhancement SR configuration or another SR configuration). In certain aspects, the processor 1004 has circuitry configured to implement the code stored in the computer-readable medium/memory 1012. The processor 1004 includes circuitry 1024 (e.g., an example of means for) for receiving (e.g., for receiving, from a UE, an SR for requesting resource allocation for data transmission) and circuitry 1026 (e.g., an example of means for) for transmitting (e.g., for transmitting an indication to the UE indicating the resource allocation for the data transmission, wherein the indication is generated based on whether the SR is in accordance with a coverage-enhancement SR configuration or another SR configuration).

Figure 11:
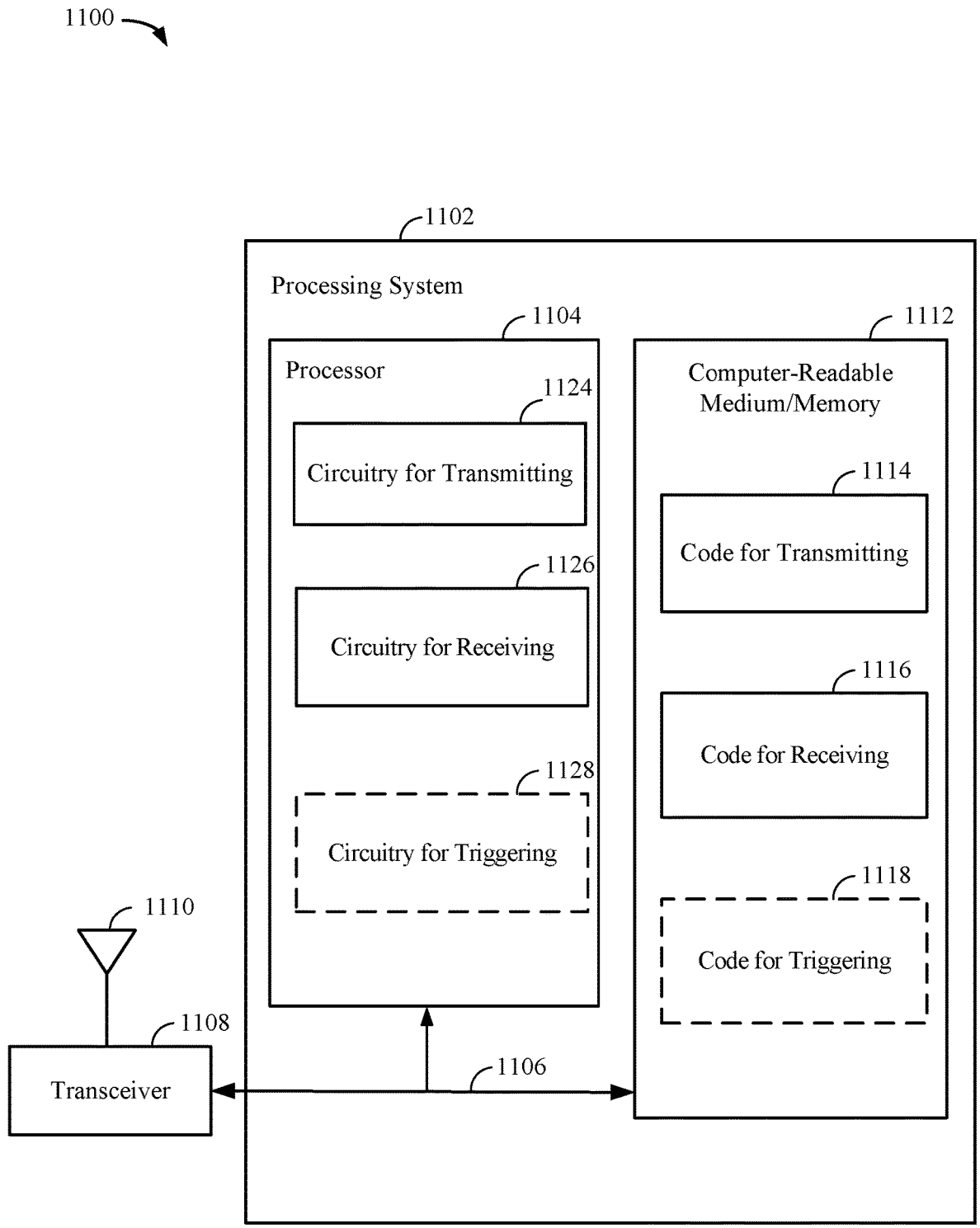
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations 500 illustrated in FIG. 5. The communications device 1100 includes a processing system 1102 coupled to a transceiver 1108 (e.g., a transmitter and/or a receiver). The transceiver 118 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations 500 illustrated in FIG. 5, or other operations for performing the various techniques discussed herein for beam switching. In certain aspects, the processor 1104 can include one or more components of UE 120*a* with reference to FIG. 2 such as, for example, controller/processor 280, transmit processor 264, receive processor 258, and/or the like. Additionally, in certain aspects, computer-readable medium 1112 can include one or more components of UE 120*a* with reference to FIG. 2 such as, for example, memory 282 and/or the like.

In certain aspects, computer-readable medium/memory 1112 stores code 1114 (e.g., an example of means for) for transmitting (e.g., transmitting an SR to a BS to request resource allocation for data transmission, wherein the SR is selected between at least one coverage-enhancement SR configuration and another SR configuration at the UE for requesting the resource allocation for the data transmission) and code 1116 (e.g., an example of means for) for receiving (e.g., for receiving an indication indicating the resource allocation for the data transmission). In some aspects, computer-readable medium/memory 1112 optionally stores code 1118 (e.g., an example of means for) for triggering (e.g., triggering a BFR). In certain aspects, the processor 1104 has circuitry configured to implement the code stored in the computer-readable medium/memory 1112. The processor 1104 includes circuitry 1124 (e.g., an example of means for) for transmitting (e.g., transmitting an SR to a BS to request resource allocation for data transmission, wherein the SR is selected between at least one coverage-enhancement SR configuration and another SR configuration at the UE for requesting the resource allocation for the data transmission) and circuitry 1126 (e.g., an example of means for) for receiving (e.g., for receiving an indication indicating the resource allocation for the data transmission). In some aspects, the processor 1104 optionally includes circuitry 1128 (e.g., an example of means for) for triggering.

The transceiver 1008 or 1108 may provide a means for receiving or transmitting information such as packets, user data, or control information associated with various information channels (e.g., control channels, data channels, and information related to SR, etc.). Information may be passed on to other components of the communications device 1000 or 1100. The transceiver 1008 or 1108 may be an example of aspects of the transceiver 254 described with reference to FIG. 2. The antenna 1010 or 1110 may correspond to a single antenna or a set of antennas. The transceiver 1008 or 1108 may provide means for transmitting signals generated by other components of the communications device 1000 or 1100.

The scheduling manager 112 or 122 may support wireless communication in accordance with examples as disclosed herein.

The scheduling manager 112 or 122 may be an example of means for performing various aspects described herein. The scheduling manager 112 or 122, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the scheduling manager 112 or 122, or its sub-components, may be implemented in code (e.g., as configuration management software or firmware) executed by a processor, or any combination thereof. If implemented in code executed by a processor, the functions of the scheduling manager 112 or 122, or its sub-components may be executed by a general-purpose processor, a DSP, an ASIC, a FPGA or other programmable logic device.

In some examples, the scheduling manager 112 or 122 may be configured to perform various operations (e.g., receiving, determining, transmitting) using or otherwise in cooperation with the transceiver 108 or 118.

The scheduling manager 112 or 122, or its sub-components, may be physically located at various positions, including being distributed such that portions of functions are implemented at different physical locations by one or more physical components. In some examples, the scheduling manager 112 or 122, or its sub-components, may be a separate and distinct component in accordance with various aspects of the present disclosure. In some examples, the scheduling manager 112 or 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Clause 1: A method for wireless communication by a user equipment (UE), comprising: transmitting a scheduling request (SR) to a base station (BS) to request resource allocation for data transmission, wherein the SR is selected between at least one coverage-enhancement SR configuration and another SR configuration at the UE for requesting the resource allocation for the data transmission; and receiving an indication of the resource allocation for the data transmission.

Clause 2: The method of Clause 1, wherein the indication comprises downlink control information (DCI).

Clause 3: The method of Clause 1 or 2, wherein one of the at least one coverage-enhancement SR configuration is configured at the UE for requesting the resource allocation on a channel experiencing degraded channel quality.

Clause 4: The method of any of Clause 1-3, wherein one of the at least one coverage-enhancement SR configuration is configured at the UE for requesting the resource allocation when there is a lack of a response to the SR from the BS.

Clause 5: The method of any of Clauses 1-4, wherein the at least one coverage-enhancement SR configuration comprises multiple coverage-enhancement SR configurations, and wherein a type of each of the multiple coverage-enhancement SR configurations is associated with a cause for selecting the at least one coverage-enhancement SR configuration over the other SR configuration.

Clause 6: The method of any of Clauses 1-5, wherein the SR is in accordance with the coverage-enhancement SR configuration and indicates, to the BS, to trigger channel state information (CSI)-reference signal (RS) transmissions.

Clause 7: The method of any of Clauses 1-6, further comprising receiving an indication of the coverage-enhancement SR configuration from the BS.

Clause 8: The method of any of Clauses 1-7, wherein: the at least one coverage-enhancement SR configuration has a different format than the other SR configuration; the at least one coverage-enhancement SR configuration is associated with different time or frequency resources for transmission of a corresponding SR as compared to the other SR configuration; the at least one coverage-enhancement SR configuration is associated with a different duty cycle for transmission of the corresponding SR as compared to the other SR configuration; the at least one coverage-enhancement SR configuration is associated with different transmission parameters for transmission of the corresponding SR as compared to the other SR configuration; and or any combination thereof.

Clause 9: The method of any of Clauses 1-8, wherein the at least one coverage-enhancement SR configuration is associated with a policy for triggering beam failure recovery (BFR) different than a policy for triggering BFR for the other SR configuration.

Clause 10: The method of Clause 9, wherein the policy for triggering the BFR for the at least one coverage-enhancement SR configuration comprises a policy to trigger the BFR after a single failed attempt for requesting scheduling using the at least one coverage-enhancement SR configuration.

Clause 11: The method of any of Clauses 1-10, wherein the at least one coverage-enhancement SR configuration is selected after one or more failed attempts for requesting scheduling via the other SR configuration.

Clause 12: The method of Clause 11, further comprising triggering BFR after another failed attempt for requesting scheduling using the coverage-enhancement SR configuration.

Clause 13: The method of Clause 11 or 12, wherein the one or more failed attempts comprise a quantity of failed attempts as configured at the UE.

Clause 14: The method of any of Clauses 1-13, further comprising receiving an indication to activate the at least one coverage-enhancement SR configuration at the UE.

Clause 15: The method of Clause 14, wherein receiving the indication to activate the at least one coverage-enhancement SR configuration comprises receiving downlink control information (DCI) indicating to activate the at least one coverage-enhancement SR configuration.

Clause 16: The method of any of Clauses 1-15, wherein the SR in accordance with the coverage-enhancement SR configuration comprises repetitions of the other SR configuration.

Clause 17: A method for wireless communication by a base station (BS), comprising: receiving, from a user equipment (UE), a scheduling request (SR) requesting resource allocation for data transmission; and transmitting an indication to the UE indicating the resource allocation for the data transmission, wherein the indication is generated based on whether the SR is in accordance with at least one coverage-enhancement SR configuration or another SR configuration.

Clause 18: The method of Clause 17, wherein the indication comprises downlink control information (DCI).

Clause 19: The method of Clause 17 or 18, wherein the at least one coverage-enhancement SR configuration is configured for requesting the resource allocation on a channel experiencing degraded channel quality.

Clause 20: The method of any of Clauses 17-19, wherein the at least one coverage-enhancement SR configuration is configured for requesting the resource allocation when there is a lack of a response by the BS to an SR transmitted by the UE.

Clause 21: The method of any of Clauses 17-20, wherein the SR is in accordance with the at least one coverage-enhancement SR configuration and indicates, to the BS, to trigger channel state information (CSI)-reference signal (RS) transmissions to enhance coverage for the data transmission.

Clause 22: The method of any of Clauses 17-21, further comprising transmitting, to the UE, an indication of the at least one coverage-enhancement SR configuration.

Clause 23: The method of any of Clauses 17-22, wherein: the at least one coverage-enhancement SR configuration has a different format than the other SR configuration; the at least one coverage-enhancement SR configuration is associated with different time or frequency resources for transmission of a corresponding SR as compared to the other SR configuration; the at least one coverage-enhancement SR configuration is associated with a different duty cycle for transmission of the corresponding SR as compared to the other SR configuration; the at least one coverage-enhancement SR configuration is associated with different transmission parameters for transmission of the corresponding SR as compared to the other SR configuration; and or any combination thereof.

Clause 24: The method of any of Clauses 17-23, further comprising transmitting, to the UE, an indication to activate the at least one coverage-enhancement SR configuration at the UE.

Clause 25: The method of Clause 26, wherein transmitting the indication to activate the at least one coverage-enhancement SR configuration comprises transmitting downlink control information (DCI) indicating to activate the at least one coverage-enhancement SR configuration.

Clause 26: The method of any of Clauses 17-25, wherein the SR in accordance with the at least one coverage-enhancement SR configuration comprises repetitions of the other SR configuration.

Clause 27: A method for wireless communication by a user equipment (UE), comprising: selecting between a coverage-enhancement scheduling request (SR) configuration and another SR configuration at the UE for requesting resource allocation for data transmission; generating an SR in accordance with the selection; transmitting the SR to a base station (BS) to request the resource allocation for the data transmission; and receiving downlink control information (DCI) indicating the resources allocation for the data transmission.

Clause 28: The method of Clause 27, wherein the coverage-enhancement SR configuration is configured at the UE for requesting the resource allocation on a channel experiencing degraded channel quality.

Clause 29: The method of Clause 27 or 28, wherein the coverage-enhancement SR configuration comprises a configuration for SR transmission with enhanced coverage.

Clause 30: The method of any one of Clauses 27-29, wherein the SR is in accordance with the coverage-enhancement SR configuration and indicates to the BS to take one or more actions to enhance coverage for the data transmission.

Clause 31: The method of any one of Clauses 27-30, wherein the SR is in accordance with the coverage-enhancement SR configuration and indicates, to the BS, to trigger channel state information (CSI)-reference signal (RS) transmissions to enhance coverage for the data transmission.

Clause 32: The method of any one of Clauses 27-31, further comprising receiving an indication of the coverage-enhancement scheduling request (SR) configuration from the BS.

Clause 33: The method of any one of Clauses 27-32, wherein: the coverage-enhancement SR configuration has a different format than the other SR configuration; the coverage-enhancement SR configuration is associated with different time or frequency resources for transmission of a corresponding SR as compared to the other SR configuration; the coverage-enhancement SR configuration is associated with a different duty cycle for transmission of the corresponding SR as compared to the other SR configuration; the coverage-enhancement SR configuration is associated with different transmission parameters for transmission of the corresponding SR as compared to the other SR configuration; and or any combination thereof.

Clause 34: The method of any one of Clauses 27-33, wherein the coverage-enhancement SR configuration is associated with a different policy for triggering beam failure recovery (BFR) as compared to the other SR configuration.

Clause 35: The method of Clause 34, wherein the policy for triggering the BFR for the coverage-enhancement SR configuration comprises a policy to trigger the BFR after a single failed attempt for requesting scheduling using the coverage-enhanced SR configuration.

Clause 36: The method of any one of Clauses 27-35, wherein the selection comprises selecting the coverage-enhancement SR configuration after one or more failed attempts for requesting scheduling via the other SR configuration.

Clause 37: The method of Clause 37, further comprising triggering BFR after another failed attempt for requesting scheduling using the coverage-enhanced SR configuration.

Clause 38: The method of Clause 36 or 37, wherein the one or more failed attempts comprises a quantity of failed attempts as configured at the UE.

Clause 39: The method of any one of Clauses 27-38, further comprising receiving an indication to activate the coverage-enhancement SR configuration at the UE.

Clause 40: The method of Clause 39, wherein receiving the indication to activate the coverage-enhancement SR configuration comprises receiving downlink control information (DCI) indicating to activate the coverage-enhancement SR configuration.

Clause 41: The method of any one of Clauses 27-40, wherein the SR in accordance with the coverage-enhancement SR configuration comprises repetitions of the other SR configuration.

Clause 42: A method for wireless communication by a base station (BS), comprising: receiving, from a user equipment (UE), a scheduling request (SR) for requesting resource allocation for data transmission; determining whether the SR is in accordance with a coverage-enhancement scheduling request (SR) configuration or another SR configuration; generating downlink control information (DCI) indicating the resource allocation for the data transmission; and transmitting the DCI to the UE.

Clause 43: The method of Clause 42, wherein the coverage-enhancement SR configuration is configured for requesting the resource allocation on a channel experiences degraded channel quality.

Clause 44: The method of Clause 42 or 43, wherein the coverage-enhancement SR configuration comprises a configuration for SR transmission with enhanced coverage.

Clause 45: The method of any one of Clauses 42-44, wherein the SR is in accordance with the coverage-enhancement SR configuration and indicates to the BS to take one or more actions to enhance coverage for the data transmission.

Clause 46: The method of any one of Clauses 42-45, wherein the SR is in accordance with the coverage-enhancement SR configuration and indicates, to the BS, to trigger channel state information (CSI)-reference signal (RS) transmissions to enhance coverage for the data transmission.

Clause 47: The method of any one of Clauses 42-46, further comprising transmitting, to the UE, an indication of the coverage-enhancement SR configuration.

Clause 48: The method of any one of Clauses 42-47, wherein: the coverage-enhancement SR configuration has a different format than the other SR configuration; the coverage-enhancement SR configuration is associated with different time or frequency resources for transmission of a corresponding SR as compared to the other SR configuration; the coverage-enhancement SR configuration is associated with a different duty cycle for transmission of the corresponding SR as compared to the other SR configuration; the coverage-enhancement SR configuration is associated with different transmission parameters for transmission of the corresponding SR as compared to the other SR configuration; and or any combination thereof.

Clause 49: The method of any one of Clauses 42-48, further comprising transmitting, to the UE, an indication to activate the coverage-enhancement SR configuration at the UE.

Clause 50: The method of Clause 49, wherein transmitting the indication to activate the coverage-enhancement SR configuration comprises transmitting downlink control information (DCI) indicating to activate the coverage-enhancement SR configuration.

Clause 51: The method of any one of Clauses 42-50, wherein the SR in accordance with the coverage-enhancement SR configuration comprises repetitions of the other SR configuration.

Clause 52: An apparatus, comprising: a memory; and one or more processors coupled to the memory, the memory and the one or more processors being configured to perform a method in accordance with any one of Clauses 1-51.

Clause 53: An apparatus, comprising means for performing a method in accordance with any one of Clauses 1-51.

Clause 54: A non-transitory computer-readable medium comprising executable instructions that, when executed by one or more processors of an apparatus, cause the apparatus to perform a method in accordance with any one of Clauses 1-51.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and B S, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
transmitting a scheduling request (SR) to a base station (BS) to request resource allocation for data transmission, wherein the SR is selected between at least one coverage-enhancement SR configuration and another SR configuration at the UE for requesting the resource allocation for the data transmission; and
receiving an indication of the resource allocation for the data transmission;
wherein the at least one coverage-enhancement SR configuration is associated with a policy for triggering beam failure recovery (BFR) different than a policy for triggering BFR for the other SR configuration.

2. The method of claim 1, wherein the indication comprises downlink control information (DCI).

3. The method of claim 1, wherein one of the at least one coverage-enhancement SR configuration is configured at the UE for requesting the resource allocation on a channel experiencing degraded channel quality.

4. The method of claim 1, wherein one of the at least one coverage-enhancement SR configuration is configured at the UE for requesting the resource allocation when there is a lack of a response to the SR from the BS.

5. The method of claim 1, wherein the at least one coverage-enhancement SR configuration comprises multiple coverage-enhancement SR configurations, and wherein a type of each of the multiple coverage-enhancement SR configurations is associated with a cause for selecting the at least one coverage-enhancement SR configuration over the other SR configuration.

6. The method of claim 1, wherein the SR is in accordance with the coverage-enhancement SR configuration and indicates, to the BS, to trigger channel state information (CSI)-reference signal (RS) transmissions.

7. The method of claim 1, further comprising receiving an indication of the coverage-enhancement SR configuration from the BS.

8. The method of claim 1, wherein:
the at least one coverage-enhancement SR configuration has a different format than the other SR configuration;
the at least one coverage-enhancement SR configuration is associated with different time or frequency resources for transmission of a corresponding SR as compared to the other SR configuration;
the at least one coverage-enhancement SR configuration is associated with a different duty cycle for transmission of the corresponding SR as compared to the other SR configuration;
the at least one coverage-enhancement SR configuration is associated with different transmission parameters for transmission of the corresponding SR as compared to the other SR configuration; and
or any combination thereof.

9. The method of claim 1, wherein the policy for triggering the BFR for the at least one coverage-enhancement SR configuration comprises a policy to trigger the BFR after a single failed attempt for requesting scheduling using the at least one coverage-enhancement SR configuration.

10. The method of claim 1, wherein the at least one coverage-enhancement SR configuration is selected after one or more failed attempts for requesting scheduling via the other SR configuration.

11. The method of claim 10, further comprising triggering BFR after another failed attempt for requesting scheduling using the coverage-enhancement SR configuration.

12. The method of claim 10, wherein the one or more failed attempts comprise a quantity of failed attempts as configured at the UE.

13. The method of claim 1, further comprising receiving an indication to activate the at least one coverage-enhancement SR configuration at the UE.

14. The method of claim 13, wherein receiving the indication to activate the at least one coverage-enhancement SR configuration comprises receiving downlink control information (DCI) indicating to activate the at least one coverage-enhancement SR configuration.

15. The method of claim 1, wherein the SR in accordance with the coverage-enhancement SR configuration comprises repetitions of the other SR configuration.

16. A method for wireless communication by a base station (BS), comprising:
receiving, from a user equipment (UE), a scheduling request (SR) requesting resource allocation for data transmission; and
transmitting an indication to the UE indicating the resource allocation for the data transmission, wherein the indication is generated based on whether the SR is in accordance with at least one coverage-enhancement SR configuration or another SR configuration;
wherein the at least one coverage-enhancement SR configuration is associated with a policy for triggering beam failure recovery (BFR) different than a policy for triggering BFR for the other SR configuration.

17. The method of claim 16, wherein the indication comprises downlink control information (DCI).

18. The method of claim 16, wherein the at least one coverage-enhancement SR configuration is configured for requesting the resource allocation on a channel experiencing degraded channel quality.

19. The method of claim 16, wherein the at least one coverage-enhancement SR configuration is configured for requesting the resource allocation when there is a lack of a response by the BS to an SR transmitted by the UE.

20. The method of claim 16, wherein the SR is in accordance with the at least one coverage-enhancement SR configuration and indicates, to the BS, to trigger channel state information (CSI)-reference signal (RS) transmissions.

21. The method of claim 16, further comprising transmitting, to the UE, an indication of the at least one coverage-enhancement SR configuration.

22. The method of claim 16, wherein:
the at least one coverage-enhancement SR configuration has a different format than the other SR configuration;
the at least one coverage-enhancement SR configuration is associated with different time or frequency resources for transmission of a corresponding SR as compared to the other SR configuration;
the at least one coverage-enhancement SR configuration is associated with a different duty cycle for transmission of the corresponding SR as compared to the other SR configuration;
the at least one coverage-enhancement SR configuration is associated with different transmission parameters for transmission of the corresponding SR as compared to the other SR configuration; and
or any combination thereof.

23. The method of claim 16, further comprising transmitting, to the UE, an indication to activate the at least one coverage-enhancement SR configuration at the UE.

24. The method of claim 23, wherein transmitting the indication to activate the at least one coverage-enhancement SR configuration comprises transmitting downlink control information (DCI) indicating to activate the at least one coverage-enhancement SR configuration.

25. The method of claim 16, wherein the SR in accordance with the at least one coverage-enhancement SR configuration comprises repetitions of the other SR configuration.

26. An apparatus for wireless communication by a user equipment (UE), comprising:
a memory; and
one or more processors coupled to the memory, the memory and the one or more processors being configured to:
transmit a scheduling request (SR) to a base station (BS) to request resource allocation for data transmission, wherein the SR is selected between at least one coverage-enhancement SR configuration and another SR configuration at the UE for requesting the resource allocation for the data transmission; and
receive an indication indicating the resource allocation for the data transmissions:
wherein the at least one coverage-enhancement SR configuration is associated with a policy for triggering beam failure recovery (BFR) different than a policy for triggering BFR for the other SR configuration.

27. The apparatus of claim 26, wherein one of the at least one coverage-enhancement SR configuration is configured at the UE for requesting the resource allocation on a channel experiencing degraded channel quality.

28. The apparatus of claim 26, wherein one of the at least one coverage-enhancement SR configuration is configured at the UE for requesting the resource allocation when there is a lack of a response to the SR from the BS.

29. An apparatus for wireless communication by a base station (BS), comprising:
a memory; and
one or more processors coupled to the memory, the memory and the one or more processors being configured to:
receive, from a user equipment (UE), a scheduling request (SR) for requesting resource allocation for data transmission; and
transmit an indication to the UE indicating the resource allocation for the data transmission, wherein the indication is generated based on whether the SR is in accordance with at least one coverage-enhancement SR configuration or another SR configuration;
wherein the at least one coverage-enhancement SR configuration is associated with a policy for triggering beam failure recovery (BFR) different than a policy for triggering BFR for the other SR configuration.

* * * * *